United States Patent
Bilik et al.

(10) Patent No.: US 10,466,346 B2
(45) Date of Patent: Nov. 5, 2019

(54) METHOD AND APPARATUS FOR CONTINUOUS TRACKING IN A MULTI-RADAR SYSTEM

(71) Applicant: GM GLOBAL TECHNOLOGY OPERATIONS LLC, Detroit, MI (US)

(72) Inventors: Igal Bilik, Rehovot (IL); Ishai Eljarat, Raanana (IL); Alexander Pokrass, Bat Yam (IL)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 172 days.

(21) Appl. No.: 15/815,812

(22) Filed: Nov. 17, 2017

(65) Prior Publication Data

US 2019/0154824 A1    May 23, 2019

(51) Int. Cl.
| | |
|---|---|
| *G01S 13/06* | (2006.01) |
| *G01S 13/66* | (2006.01) |
| *G01S 7/41* | (2006.01) |
| *G01S 13/89* | (2006.01) |
| *G01S 13/87* | (2006.01) |

(52) U.S. Cl.
CPC .............. *G01S 13/06* (2013.01); *G01S 7/411* (2013.01); *G01S 7/415* (2013.01); *G01S 13/66* (2013.01); *G01S 13/87* (2013.01); *G01S 13/89* (2013.01)

(58) Field of Classification Search
CPC .......... G01S 13/06; G01S 13/66; G01S 13/87; G01S 13/89; G01S 7/411; G01S 7/415
See application file for complete search history.

(56) References Cited

U.S. PATENT DOCUMENTS

| | | | |
|---|---|---|---|
| 2008/0150787 A1* | 6/2008 | Cummings | G01S 7/003 342/59 |
| 2009/0040094 A1* | 2/2009 | Harada | G01S 13/87 342/59 |
| 2015/0198711 A1* | 7/2015 | Zeng | G01S 13/726 342/59 |
| 2017/0254880 A1* | 9/2017 | Smith | G01S 13/86 |

* cited by examiner

*Primary Examiner* — Aaron L Troost
(74) *Attorney, Agent, or Firm* — Lorenz & Kopf, LLP

(57) ABSTRACT

Methods and systems are provided for controlling a radar system of a vehicle. One or more transmitters are configured to transmit radar signals and tracking information is translated and coupled between radar transmitters in order to reduce target acquisition times when commencing a new track.

11 Claims, 6 Drawing Sheets

METHOD AND APPARATUS FOR CONTINUOUS TRACKING IN A MULTI-RADAR SYSTEM

TECHNICAL FIELD

The present disclosure generally relates to vehicles, and more particularly relates to systems and methods for reducing the latency when starting a track in radar systems for vehicles.

BACKGROUND

Certain vehicles today utilize radar systems. For example, certain vehicles utilize radar systems to detect other vehicles, pedestrians, or other objects on a road in which the vehicle is travelling. Radar systems may be used in this manner, for example, in implementing automatic braking systems, adaptive cruise control, and avoidance features, among other vehicle features. Certain vehicle radar systems, called multiple input, multiple output (MIMO) radar systems, have multiple transmitters and receivers. While radar systems are generally useful for such vehicle features, in certain situations existing radar systems may have certain limitations.

When a vehicle is in movement, the relative position of a target with respect to each radar on the vehicle changes as well. When a target relative position changes from one radar to another, the second radar must initiate the tracking processes. This initialization of the tracking processes introduces an undesirable latency. It would be desirable to overcome this latency and to provide continuous tracking in the vehicular radar system. It is also desirable to provide methods, systems, and vehicles utilizing to overcome this problem. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for tracking an object. The method comprises tracking an object within a first field of view to generate a first tracking information, determining that the object is entering a second field of view, tracking the object within the second field of view in response to the first tracking information to generate a second tracking information, and generating a radar map in response to the first tracking information and the second tracking information.

In accordance with an exemplary embodiment, an apparatus is provided. The apparatus comprises a first radar for tracking a first object within a first field of view to generate a tracking information and transmitting the tracking information to a processor, a second radar for observing a second field of view, and the processor for determining the first object location in response to the tracking information and transmitting the tracking information to the second radar.

In accordance with an exemplary embodiment, a method is provided. The method comprising determining an object location within a first field of view, transmitting the object location within the first field of view to an sensor observing a second field of view, determining the object location within the second field of view in response to the object location within the first field of view, and generating an object map in response to the object location within the first field of view and the object location within the second field of view.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
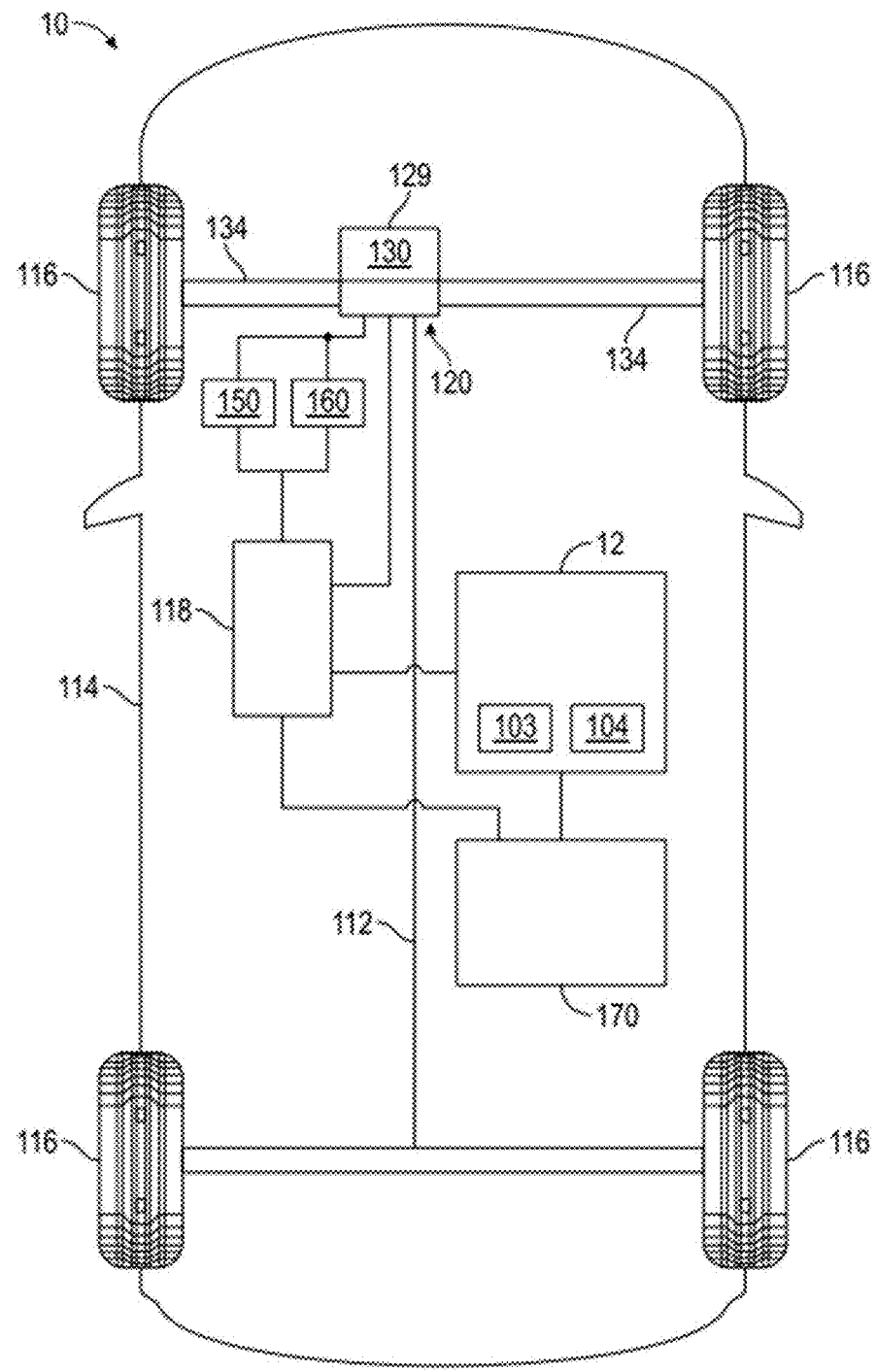
FIG. 1 is a functional block diagram of a vehicle having a control system, including a radar system, in accordance with an exemplary embodiment.

FIG. 1 provides a functional block diagram of vehicle 10, in accordance with an exemplary embodiment. As described in further detail greater below, the vehicle 10 includes a radar control system 12 having a radar system 103 and a controller 104 that classifies objects based upon a three dimensional representation of the objects using received radar signals of the radar system 103.

In the depicted embodiment, the vehicle 10 also includes a chassis 112, a body 114, four wheels 116, an electronic control system 118, a steering system 150, and a braking system 160. The body 114 is arranged on the chassis 112 and substantially encloses the other components of the vehicle 10. The body 114 and the chassis 112 may jointly form a frame. The wheels 116 are each rotationally coupled to the chassis 112 near a respective corner of the body 114.

In the exemplary embodiment illustrated in FIG. 1, the vehicle 10 includes an actuator assembly 120. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is also mechanically coupled to a transmission. In other embodiments, the engine 130 may instead be coupled to a generator used to power an electric motor that is mechanically coupled to a transmission.

The steering system 150 is mounted on the chassis 112, and controls steering of the wheels 116. The steering system 150 includes a steering wheel and a steering column (not depicted). The steering wheel receives inputs from a driver of the vehicle 10. The steering column results in desired steering angles for the wheels 116 via the drive shafts 134 based on the inputs from the driver.

The braking system 160 is mounted on the chassis 112, and provides braking for the vehicle 10. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle 10, as well as various other inputs for various vehicle devices and/or systems, such as one or more vehicle radios, other entertainment or infotainment systems, environmental control systems, lightning units, navigation systems, and the like (not depicted in FIG. 1).

Also as depicted in FIG. 1, in certain embodiments the vehicle 10 may also include a telematics system 170. In one such embodiment the telematics system 170 is an onboard device that provides a variety of services through communication with a call center (not depicted) remote from the vehicle 10. In various embodiments the telematics system may include, among other features, various non-depicted features such as an electronic processing device, one or more types of electronic memory, a cellular chipset/component, a wireless modem, a dual mode antenna, and a navigation unit containing a GPS chipset/component. In certain embodiments, certain of such components may be included in the controller 104, for example as discussed further below in connection with FIG. 2. The telematics system 170 may provide various services including: turn-by-turn directions and other navigation-related services provided in conjunction with the GPS chipset/component, airbag deployment notification and other emergency or roadside assistance-related services provided in connection with various sensors and/or sensor interface modules located throughout the vehicle, and/or infotainment-related services such as music, internet web pages, movies, television programs, videogames, and/or other content.

The radar control system 12 is mounted on the chassis 112. As mentioned above, the radar control system 12 classifies objects based upon a three dimensional representation of the objects using received radar signals of the radar system 103. In one example, the radar control system 12 provides these functions in accordance with the method 400 described further below in connection with FIG. 4.

While the radar control system 12, the radar system 103, and the controller 104 are depicted as being part of the same system, it will be appreciated that in certain embodiments these features may comprise two or more systems. In addition, in various embodiments the radar control system 12 may comprise all or part of, and/or may be coupled to, various other vehicle devices and systems, such as, among others, the actuator assembly 120, and/or the electronic control system 118.

Figure 2:
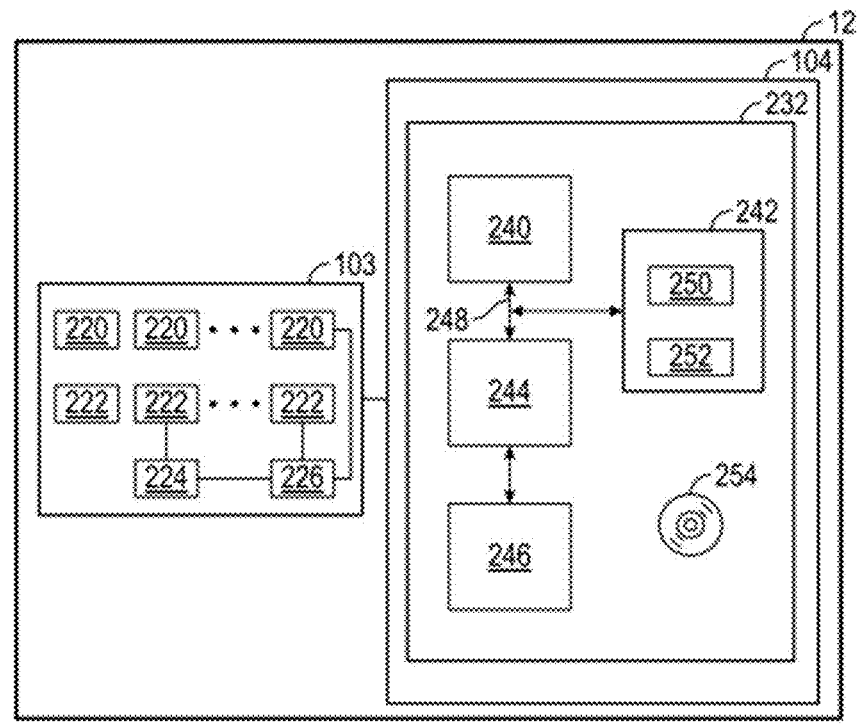
FIG. 2 is a functional block diagram of the control system of the vehicle of FIG. 1, including the radar system, in accordance with an exemplary embodiment.

With reference to FIG. 2, a functional block diagram is provided for the radar control system 12 of FIG. 1, in accordance with an exemplary embodiment. As noted above, the radar control system 12 includes the radar system 103 and the controller 104 of FIG. 1.

As depicted in FIG. 2, the radar system 103 includes one or more transmitters 220, one or more receivers 222, a memory 224, and a processing unit 226. In the depicted embodiment, the radar system 103 comprises a multiple input, multiple output (MIMO) radar system, or alternative radar system, with multiple transmitters (also referred to herein as transmission channels) 220 and multiple receivers (also referred to herein as receiving channels) 222. The transmitters 220 transmit radar signals for the radar system 103. After the transmitted radar signals contact one or more objects on or near a road on which the vehicle 10 is travelling and is reflected/redirected toward the radar system 103, the redirected radar signals are received by the receivers 222 of the radar system 103 for processing.

Figure 3:
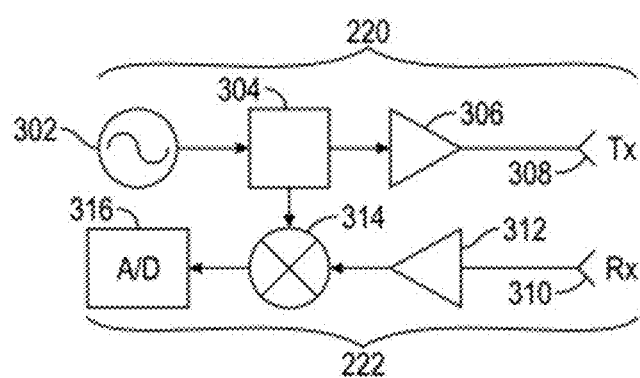
FIG. 3 is a functional block diagram of a transmission channel and a receiving channel of the radar system of FIGS. 1 and 2, in accordance with an exemplary embodiment.

With reference to FIG. 3, a representative one of the transmission channels 220 is depicted along with a respective one of the receiving channels 222 of the radar system of FIG. 3, in accordance with an exemplary embodiment. As depicted in FIG. 3, each transmitting channel 220 includes a signal generator 302, a filter 304, an amplifier 306, and an antenna 308. Also as depicted in FIG. 3, each receiving channel 222 includes an antenna 310, an amplifier 312, a mixer 314, and a sampler/digitizer 316. In certain embodiments the antennas 308, 310 may comprise a single antenna, while in other embodiments the antennas 308, 310 may comprise separate antennas. Similarly, in certain embodiments the amplifiers 306, 312 may comprise a single amplifier, while in other embodiments the amplifiers 306, 312 may comprise separate amplifiers. In addition, in certain embodiments multiple transmitting channels 220 may share one or more of the signal generators 302, filters 304, amplifiers 306, and/or antennae 308. Likewise, in certain embodiments, multiple receiving channels 222 may share one or more of the antennae 310, amplifiers 312, mixers 314, and/or samplers/digitizers 316.

The radar system 103 generates the transmittal radar signals via the signal generator(s) 302. The transmittal radar signals are filtered via the filter(s) 304, amplified via the amplifier(s) 306, and transmitted from the radar system 103 (and from the vehicle 10 to which the radar system 103 belongs, also referred to herein as the "host vehicle") via the antenna(e) 308. The transmitting radar signals subsequently contact other vehicles and/or other objects on or alongside the road on which the host vehicle 10 is travelling. After contacting the other vehicles and/or other objects, the radar signals are reflected, and travel from the other vehicles and/or other objects in various directions, including some signals returning toward the host vehicle 10. The radar signals returning to the host vehicle 10 (also referred to herein as received radar signals) are received by the antenna(e) 310, amplified by the amplifier(s) 312, mixed by the mixer(s) 314, and digitized by the sampler(s)/digitizer(s) 316.

Returning to FIG. 2, the radar system 103 also includes, among other possible features, the memory 224 and the processing unit 226. The memory 224 stores information received by the receiver 222 and/or the processing unit 226. In certain embodiments, such functions may be performed, in whole or in part, by a memory 242 of a computer system 232 (discussed further below).

The processing unit 226 processes the information obtained by the receivers 222 for classification of objects based upon a three dimensional representation of the objects using received radar signals of the radar system 103. The processing unit 226 of the illustrated embodiment is capable of executing one or more programs (i.e., running software) to perform various tasks instructions encoded in the program(s). The processing unit 226 may include one or more microprocessors, microcontrollers, application specific integrated circuits (ASICs), or other suitable device as realized by those skilled in the art, such as, by way of example, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In certain embodiments, the radar system 103 may include multiple memories 224 and/or processing units 226, working together or separately, as is also realized by those skilled in the art. In addition, it is noted that in certain embodiments, the functions of the memory 224, and/or the processing unit 226 may be performed in whole or in part by one or more other memories, interfaces, and/or processors disposed outside the radar system 103, such as the memory 242 and the processor 240 of the controller 104 described further below.

As depicted in FIG. 2, the controller 104 is coupled to the radar system 103. Similar to the discussion above, in certain embodiments the controller 104 may be disposed in whole or in part within or as part of the radar system 103. In addition, in certain embodiments, the controller 104 is also coupled to one or more other vehicle systems (such as the electronic control system 118 of FIG. 1). The controller 104 receives and processes the information sensed or determined from the radar system 103, provides detection, classification, and tracking of based upon a three dimensional representation of the objects using received radar signals of the radar system 103, and implements appropriate vehicle actions based on this information.

As depicted in FIG. 2, the controller 104 comprises the computer system 232. In certain embodiments, the controller 104 may also include the radar system 103, one or more components thereof, and/or one or more other systems. In addition, it will be appreciated that the controller 104 may otherwise differ from the embodiment depicted in FIG. 2. For example, the controller 104 may be coupled to or may otherwise utilize one or more remote computer systems and/or other control systems, such as the electronic control system 118 of FIG. 1.

As depicted in FIG. 2, the computer system 232 includes the processor 240, the memory 242, an interface 244, a storage device 246, and a bus 248. The processor 240 performs the computation and control functions of the controller 104, and may comprise any type of processor or multiple processors, single integrated circuits such as a microprocessor, or any suitable number of integrated circuit devices and/or circuit boards working in cooperation to accomplish the functions of a processing unit. In one embodiment, the processor 240 classifies objects using radar signal spectrogram data in combination with one or more computer vision models.

The memory 242 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 242 is located on and/or co-located on the same computer chip as the processor 240. In the depicted embodiment, the memory 242 stores the above-referenced program 250 along with one or more stored values 252 (such as, by way of example, information from the received radar signals and the spectrograms therefrom).

The bus 248 serves to transmit programs, data, status and other information or signals between the various components of the computer system 232. The interface 244 allows communication to the computer system 232, for example from a system driver and/or another computer system, and can be implemented using any suitable method and apparatus. The interface 244 can include one or more network interfaces to communicate with other systems or components. In one embodiment, the interface 244 includes a transceiver. The interface 244 may also include one or more network interfaces to communicate with technicians, and/or one or more storage interfaces to connect to storage apparatuses, such as the storage device 246.

The storage device 246 can be any suitable type of storage apparatus, including direct access storage devices such as hard disk drives, flash systems, floppy disk drives and optical disk drives. In one exemplary embodiment, the storage device 246 comprises a program product from which memory 242 can receive a program 250 that executes one or more embodiments of one or more processes of the present disclosure, such as the method 400 (and any sub-processes thereof) described further below in connection with FIGS. 4-6. In another exemplary embodiment, the program product may be directly stored in and/or otherwise accessed by the memory 242 and/or a disk (e.g., disk 254), such as that referenced below.

The bus 248 can be any suitable physical or logical means of connecting computer systems and components. This includes, but is not limited to, direct hard-wired connections, fiber optics, infrared and wireless bus technologies. During operation, the program 250 is stored in the memory 242 and executed by the processor 240.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 240) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 232 may also otherwise differ from the embodiment depicted in FIG. 2, for example in that the computer system 232 may be coupled to or may otherwise utilize one or more remote computer systems and/or other control systems.

Figure 4:
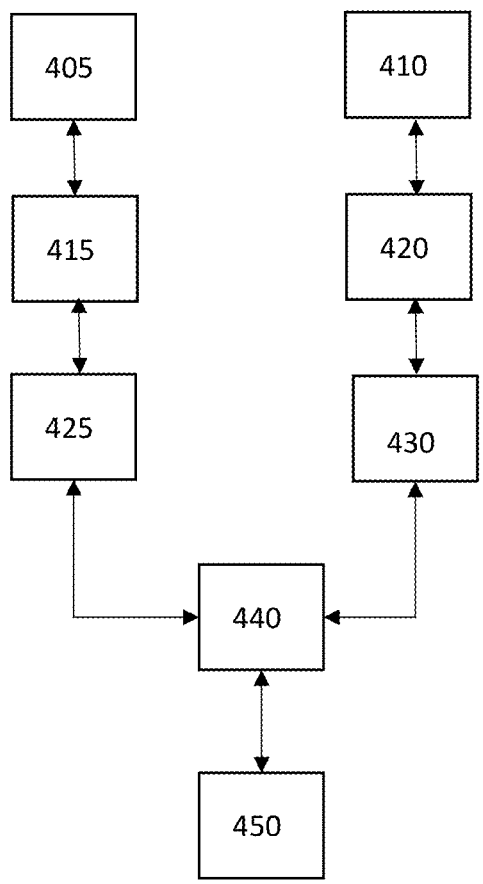
FIG. 4 shows an exemplary environment for an apparatus for parallel radar signal processing.

Turning now to FIG. 4, an apparatus for parallel radar signal processing 400 is shown. The apparatus is, according to an exemplary embodiment, operative to localize the objects within a field of view. The apparatus is used to, localize, or determine the position, of the objects by determining their position either relative to the host vehicle or to some global reference coordinate. Localizing may include determining the range azimuth and elevation angles of the target with respect to the host vehicle and its velocity. Furthermore, the apparatus 400 may be operative to determine which objects are static and what are dynamic helps in scene understanding, since there are very many radar echoes form static objects and much less from dynamic, in terms of computational complexity it requires to make sure that we allocate sufficient resources to dynamic objects. In addition, processing of radar echoes form dynamic vs. static objects may be very different. Typical scenario for automotive radar consists of multiple every strong, large size, echoes form static objects and few much weaker, small size, such as pedestrian, dynamic objects. Thus static objects can mask dynamic objects. Therefore it would be desirable to first to filter our radar echoes from the static object in order to detect dynamic objects.

The apparatus 400 has a first antenna 405 and a second antenna 410 for transmitting and receiving radar pulses. The antennas may be a single element antenna or an array of antenna elements, such as an antenna array wherein the elements of the antenna array are connected in a way in order to combine the received signals in a specified amplitude and phase relationships. Each of the antenna elements may be coupled to an amplifier and/or phase shifter.

Each of the first antenna 405 and the second antenna 410 may be a phased array, which employs a plurality of fixed antenna elements in which the relative phases of the respective signals fed to the fixed antenna elements may be adjusted in a way which alters the effective radiation pattern of the antenna array such the gain of the array is reinforced in a desired direction and suppressed in undesired directions. This has the desirable effect of allowing a stationary antenna array to be incorporated into a vehicle body while still allowing the field of view of the antenna to be increased.

The first antenna 405 and the second antenna 410 are coupled to a first A/D converter 415 and a second A/D converter 420 respectively. The first A/D converter 415 and the second A/D converter 420 are operative to convert the received radar echoes in the signal return path to a digital representation of the received radar echoes. The digital representations of the received radar echoes are coupled to a first digital signal processor 425 and a second digital signal processor 430 for further signal processing. The outputs of the first digital signal processor 425 and a second digital signal processor 530 are coupled to a joint signal processor 440.

The first digital signal processor 425 and the second digital processor 430 may be operative to perform range Doppler processing and to extract range Doppler bins of multiplied channels that exceed a detection threshold. The range Doppler processing involves performing a fast Fourier transform (FFT) in order to extract the range and Doppler information from the received signal spectrum. A 2D FFT may be used, allowing the system to analyze the frequency spectrum of a two dimensional signal matrix.

The joint signal processor 440 is operative to process the data received from the first digital signal processor 425 and a second digital signal processor 430 in order to perform object detection, object determination and recognition and parameter estimation. The joint signal processor 440 is further operative to track the determined objects according to aspects of the exemplary embodiments. The joint signal processor 440 may then generate an object list which is stored to memory 405 and may further be operative to generate an object map used for autonomous driving and/or obstacle avoidance.

The first antenna 405 and the second antenna 410 may be oriented in a manner where they are located a defined distance apart, but have overlapping fields of view (FOV). For example, the antennas may be situated on each side of the front of a vehicle facing forward. It would be desirable if we could improve the angular resolution of each of the two antennas by using the two antenna systems in concert. The angular resolution of the system can be increased by combining the multiple observation vectors of each antenna, wherein each observation vector would have the same reflection point angle, but would have different reflection coefficients.

Figure 5:
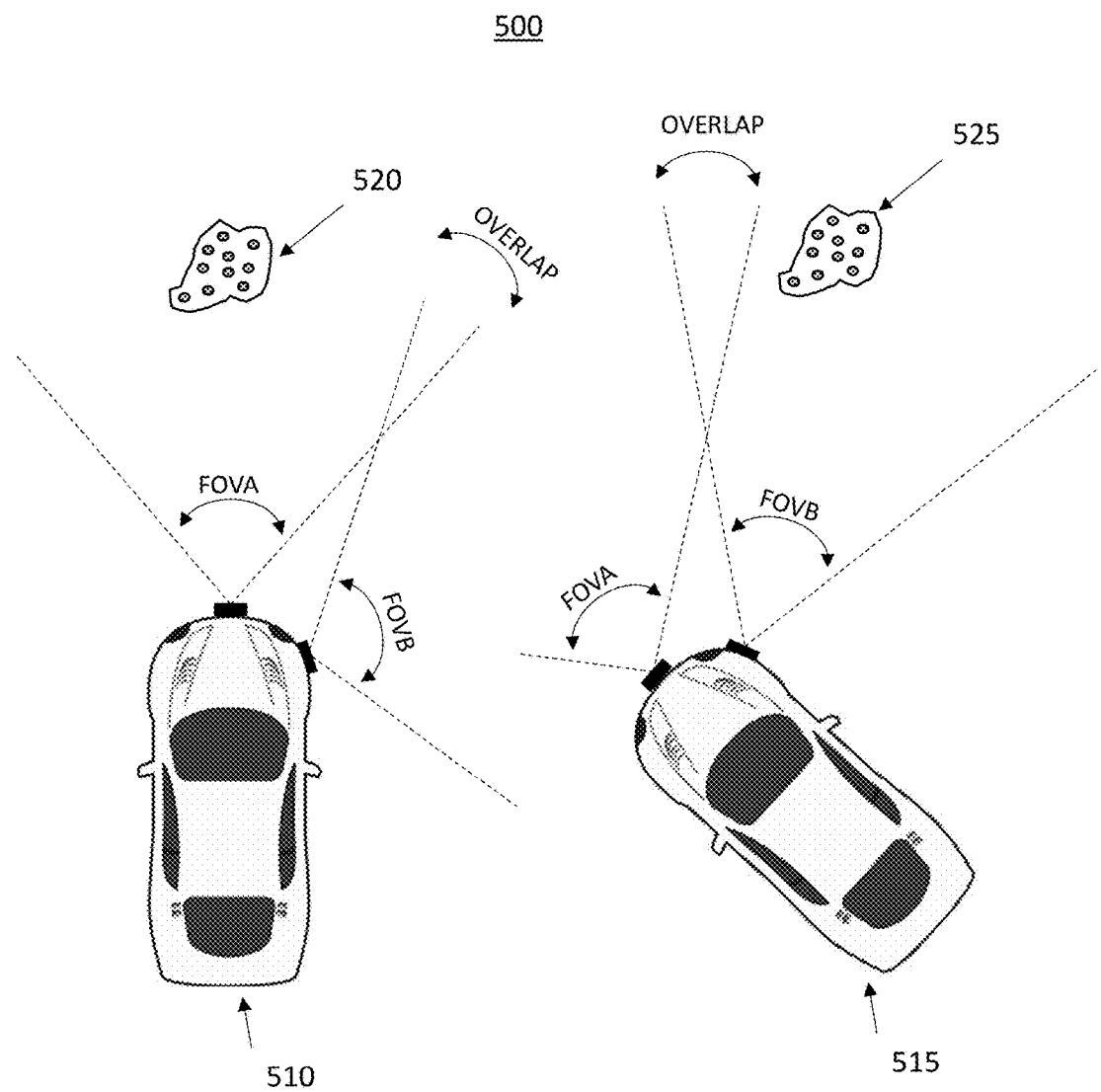
FIG. 5 shows an exemplary environment for non-stop tracking for a multi-radar system.

Turning now to FIG. 5, an exemplary environment for non-stop tracking for a multi-radar system 500 is shown. The exemplary environment shows a vehicle 510 with a first orientation to a radar target 520 and a vehicle 515 with a second orientation to a radar target 525. The vehicles 510, 515 are representative of the same vehicle at different times during a left turn. The vehicles 510, 515 are equipped with a first radar having a first field of view FOVA and a second radar having a second field of view FOVB. There is overlap OVERLAP between the first field of view FOVA and FOVB where a radar target could be tracked by both radars simultaneously.

When a vehicle is in movement, the relative position of a target with respect to each radar changes as well. One of the difficult situations is when it is necessary to exchange tracking information between sensors depending on each field of view. The proposed system is operative to improve the vehicle safety by reducing the latency when starting a track. When the first radar tracks a cluster, there will be situations that this cluster will start to leave the FOVA of this sensor and start to appear inside the FOVB of a second radar. If no information is exchanged between the radars, the second radar will have to initialize all the processing in order to track the target that has already being tracked by a first radar. It would be desirable to share data between the two radars in order to avoid the latency resulting from having to initialize all the processing by the second radar in this situation.

When a given cluster is detected and tracked by the first radar, the system is operative to keeps the information even if the target leaves the first field of view FOVA and sends this information to the second radar as initialization for tracking. The information being exchanged may include cluster position (x, y, z), Doppler and energy levels of each detection inside the cluster. The positions of the detections may be translated and rotated in order to match the coordinates of the second B by either radar or a separate transition processor. In addition, the threshold level in detector B may be adapted according to the tracking information received by the first sensor. This can reduce the probability of misdetection for this specific cluster when it comes inside the second field of view FOVB of the second radar.

Figure 6:
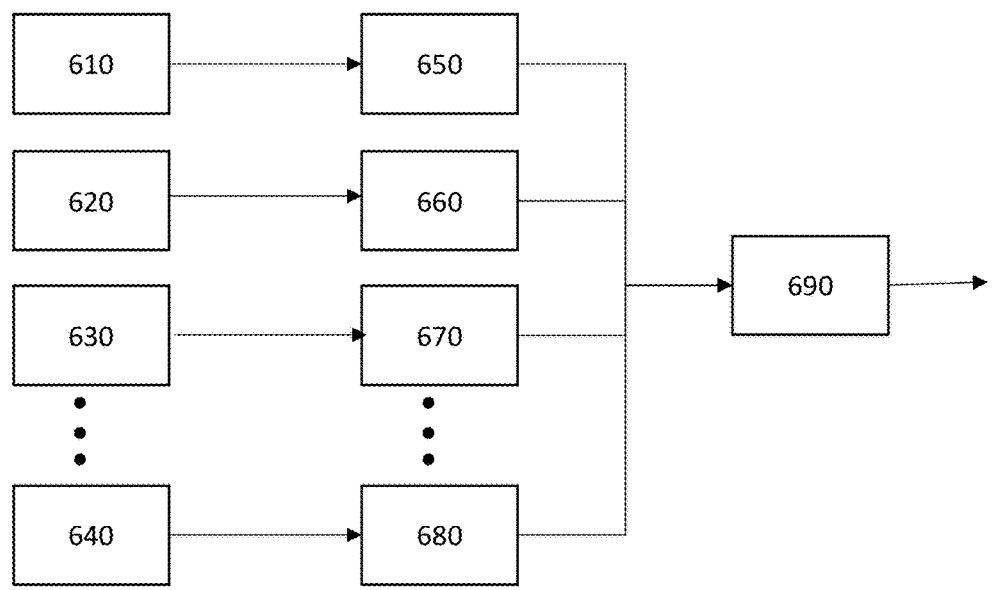
FIG. 6 shows an exemplary method for operating an apparatus for non-stop tracking for a multi-radar system.

Turning now to FIG. 6, an exemplary system for non-stop tracking for multi-radar system 600 is shown. The exemplary system has a first sensor 610, a second sensor 620, a third sensor 630 and an Nth sensor 640. A multi-radar system may have any number of sensors, but for clarity in this exemplary embodiment, the description is provided with four sensors wherein the fourth sensor is an Nth sensor. However, the current system and method may be operative with any number of sensors dependent on design of the system.

The exemplary system 600 further includes a first alignment tracker 650, a second alignment tracker 660, a third alignment tracker 670 and an Nth alignment tracker 680. In the exemplary multi-radar system there may be one alignment tracker per sensor or alignment trackers may be shared among sensors. Any number of alignment sensors may be used in a multi-radar system, depending only on design criteria and the number of sensors being employed. In this exemplary embodiment, four alignment trackers are depicted, one for each sensor.

Each sensor 610, 620, 630, 640 in the exemplary system is operative to receive radar reflection information and to generate a track list for the targets determined in response to the radar reflection information. The track lists are coupled to at least one of the alignment trackers 650, 660, 670, 680. The alignment tracker 650, 660, 670, 680 tracks alignment and is operative to coordinate translation and rotation of the tracks and generates an aligned track list. This alignment may be implemented by matrix multiplication. The aligned track list is coupled to a processor 690, wherein the processor is operative to coordinate track-to track association with, for example, a nearest neighbor with an association gate, which may optionally be spherical, to associate two tracks if the distance between them less than a gate radius. The processor may be further operative to update track ID based on the tracks within field of view. If track exits the field of view of a first Sensor, the processor transitions its ID to a second sensor. Further, if the track state of the first sensor is equal to that of the track state of the second sensor, the processor may increase track confidence by adding or averaging the individual tracks scores. This information may then be coupled to the vehicle dynamics system of use in vehicle control systems. The proposed exemplary algorithm increases vehicle safety by reducing the probability of misdetection and increasing the probability of true detection by enabling a more accurate tracking of the cluster at the beginning of the track.

Figure 7:
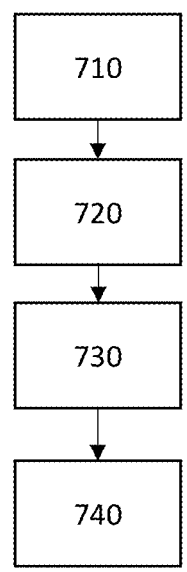
FIG. 7 shows an exemplary method for operating an apparatus for parallel radar signal processing.

Turning now to FIG. 7, an exemplary method for operating an apparatus for parallel radar signal processing 700 is shown. The method is first operative to determining an object location within a first field of view 710. The method then transmits the object location within the first field of view to a sensor observing a second field of view 720. The method then determines the object location within the second field of view in response to the object location within the first field of view 730. The method may further be operational to translate the object location within the first field of view from a first coordinate system to a second coordinate system associated with the second field of view before transmitting the object location to the second sensor. Finally, the method is operative to generate an object map in response to the object location within the first field of view and the object location within the second field of view.

The method may be performed by a parallel radar system wherein the first field of view is observed by a first radar and the second field of view is observed by a second radar. Determining the object location with a parallel radar system may involve tracking the object within the first field of view over a period of time and/or generating a cluster of detected locations and determining a centroid of the cluster.

Tracking the object within the second field of view may be initiated in a number of ways, including determining that an object is reaching an edge of a field of the first field of view proximate to the second field of view or may be made in response to the object location within the first field of view and a subsequent detection within the second field of view. The object location within the first field of view may determined in response to tracking the object within the first field of view and determining the object location is within the first field of view and the second field of view.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. An apparatus comprising:
 a first radar for tracking a first object within a first field of view to generate a tracking information and transmitting the tracking information to a processor;
 a second radar for observing a second field of view; and
 the processor for determining the first object location in response to the tracking information and transmitting the tracking information to the second radar and to determine a track to track association with a nearest neighbor within an association gate.

2. The apparatus of claim 1 wherein the processor is further operative to translate the first object location from a first coordinate system associated with the first field of view to a second coordinate system associated with the second field of view.

3. The apparatus of claim 1 wherein tracking the first object within the first field of view involves estimating the location of the first object over a period of time and determining a trajectory in response to the estimation.

4. The apparatus of claim 1 wherein tracking the first object involves generating a cluster and determining a centroid of the cluster.

5. The apparatus of claim 1 wherein the processor is further operative to receive tracking information from the second radar, to comparing the tracking information from the first radar and the tracking information from the second radar, to determine that the first radar and the second radar are tracking a common object, to generate a common track and to transmit the common track to the first radar and the second radar.

6. The apparatus of claim 1 wherein the processor is further operative to generate a radar map in response to the tracking information.

7. The apparatus of claim 1 further comprising a controller for controlling a vehicle in response to the tracking information.

8. A method comprising:
 a. tracking an object within a first field of view to generate a first tracking information;
 b. determining that the object is entering a second field of view;
 c. performing a coordinate translation and rotation on the first tracking information;
 d. tracking the object within the second field of view in response to the first tracking information to generate a second tracking information; and
 e. generating a radar map in response to the first tracking information and the second tracking information.

9. The method of claim 8 wherein tracking the object within the first field of view is performed by a first radar and tracking the object within the second field of view is performed by a second radar.

10. The method of claim 8 wherein determining the object is entering a second field of view is performed in response to detecting the object within the second field of view.

11. The method of claim 8 further comprising comparing the first tracking information and the second tracking information to determine a common object.

* * * * *